(12) United States Patent
Mikolasch

(10) Patent No.: US 10,880,305 B2
(45) Date of Patent: Dec. 29, 2020

(54) AUTHENTICATION AND ACCESS TO A DEVICE OF A FIXED LINE COMMUNICATION DEVICE

(71) Applicant: ADTRAN GmbH, Berlin (DE)

(72) Inventor: Michael Mikolasch, Berlin (DE)

(73) Assignee: Adtran GmbH, Munich (DE)

( * ) Notice: Subject to any disclaimer, the term of this patent is extended or adjusted under 35 U.S.C. 154(b) by 289 days.

(21) Appl. No.: 15/873,117

(22) Filed: Jan. 17, 2018

(65) Prior Publication Data
US 2018/0205731 A1   Jul. 19, 2018

(30) Foreign Application Priority Data
Jan. 18, 2017   (DE) .................... 10 2017 100 941

(51) Int. Cl.
*H04L 29/06* (2006.01)
*H04M 3/00* (2006.01)
*H04M 3/30* (2006.01)

(52) U.S. Cl.
CPC ........ *H04L 63/0876* (2013.01); *H04L 63/105* (2013.01); *H04M 3/305* (2013.01); *H04M 3/007* (2013.01)

(58) Field of Classification Search
CPC ... H04L 63/0876; H04L 63/105; H04L 3/305; H04M 3/007
USPC ............................................................ 726/7
See application file for complete search history.

(56) References Cited

U.S. PATENT DOCUMENTS

| 7,747,862 | B2 * | 6/2010 | Ovadia | H04L 9/3234 713/176 |
| 2003/0097561 | A1 * | 5/2003 | Wheeler | G06Q 20/02 713/168 |
| 2003/0204743 | A1 * | 10/2003 | Devadas | G06Q 20/3674 726/9 |
| 2014/0161257 | A1 * | 6/2014 | Dube | G01S 19/14 380/258 |
| 2016/0047855 | A1 * | 2/2016 | Bhunia | G01R 31/31858 324/763.01 |
| 2016/0295011 | A1 * | 10/2016 | Schalk | H04M 3/007 |
| 2016/0366586 | A1 * | 12/2016 | Gross | H04L 63/0876 |

(Continued)

FOREIGN PATENT DOCUMENTS

WO   2004055738 A1   7/2004

*Primary Examiner* — Lynn D Feild
*Assistant Examiner* — Dereena T Cattungal
(74) *Attorney, Agent, or Firm* — Fish & Richardson P.C.

(57) ABSTRACT

A method is provided accessing a device of a fixed line system comprising: (i) determining at least one measurement result by a measurement function of the device; (ii) comparing the at least one measurement result with at least one predefined value; (iii) conducting a predefined operation if the comparison indicates that the at least one measurement result corresponds to the at least one predefined value; (iv) determining the at least one measurement result by the measurement function, wherein the measurement function is connected or connectable via a connection to a signature function of an access system; (v) wherein the signature function comprises a circuitry that affects parameters measured by the measurement function of the device. Also, a method for access the device via an access system, the device, the access system and a computer program product as well as a computer-readable medium are suggested.

9 Claims, 2 Drawing Sheets

(56) References Cited

U.S. PATENT DOCUMENTS

2017/0063819 A1\* 3/2017 Dunne .................... H04L 63/08
2017/0366553 A1\* 12/2017 Shetye ................ H04L 67/2842

\* cited by examiner

AUTHENTICATION AND ACCESS TO A DEVICE OF A FIXED LINE COMMUNICATION DEVICE

CROSS REFERENCE TO RELATED APPLICATION

This patent claims priority to DE Application No. 102017100941.8, filed Jan. 18, 2017, the entire contents of which is hereby expressly incorporated by reference herein in its entirety.

BACKGROUND

Embodiments of the present invention relate to an authentication of an access system to a device of a telecommunication system.

SUMMARY

In some implementations, a method of accessing a device of a fixed line system includes the actions of determining at least one measurement result by a measurement function of the device; comparing the at least one measurement result with at least one predefined value; conducting a predefined operation if the comparison indicates that the at least one measurement result corresponds to the at least one predefined value; determining the at least one measurement result by the measurement function, wherein the measurement function is connected or connectable via a connection to a signature function of an access system; wherein the signature function comprises a circuitry that affects parameters measured by the measurement function of the device.

Some implementations include a method for accessing a device via an access system. The access system can include a signature function for setting a signature. The device can include a measurement function for measuring at least one electrical parameter. The measurement function and the signature function can be connected via a connection of a fixed line telephone system. The method can include the actions of setting by the signature function a first signature; determining a first at least one measurement result by the measurement function; comparing by the device the first at least one measurement result with a first at least one predefined value; conducting a first predefined operation if the comparison indicates that the first at least one measurement result corresponds to the first at least one predefined value.

In some implementations, a device of a fixed line system includes a processing unit that is arranged for determining at least one measurement result; comparing the at least one measurement result with at least one predefined value; conducting a predefined operation if the comparison indicates that the at least one measurement result corresponds to the at least one predefined value; determining the at least one measurement result by the measurement function, wherein the measurement function is connected or connectable via a connection to a signature function of an access system; wherein the signature function comprises a circuitry that affects parameters measured by the measurement function of the device.

Implementations include an access system for accessing the device as described herein, wherein the access system comprises a signature function that is connected or connectable via a connection, in particular a fixed line of the telephone system, to the device.

Implementations include a computer program product, which is directly loadable into a memory of a digital processing device, and which comprises software code portions for performing the steps of the method as described herein.

Implementations include a computer-readable medium having computer-executable instructions adapted to cause a computer system to perform the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
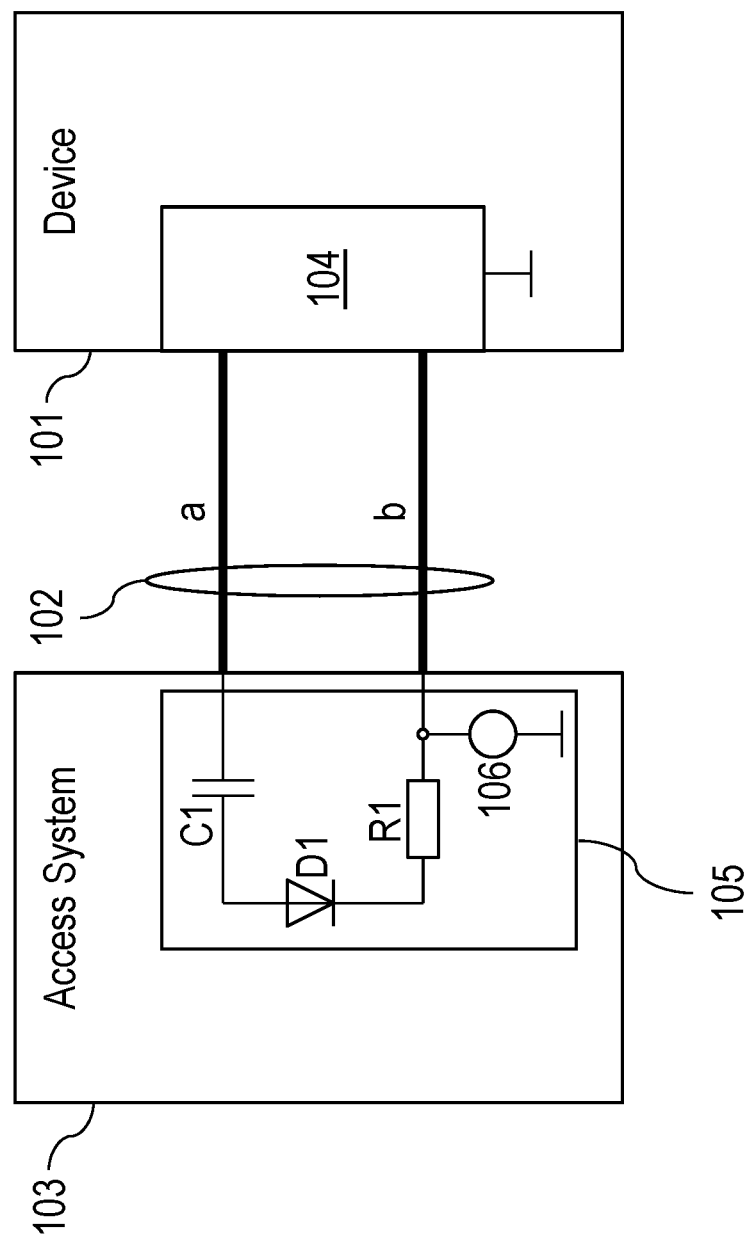
FIG. 1 shows a device of an active fixed line communication system, which is connected via a fixed line connection to an access system, wherein the access system wants to access the device.

Examples suggested herein in particular utilize a parameter of a telephone line (connection) and/or at least one individually tunable parameter like a resistance, a capacity, a voltage, a frequency or the like for an authentication procedure. Such authentication procedure allows getting access to a device thereby protecting the device from unauthorized access.

This approach may in particular be used by network operators or equipment suppliers that require a secure access to a device of an fixed line system. The device may be operative in the fixed line system during such access. Examples for such devices of a fixed line system are: a DSLAM, a CPE, a DPU or any component that is part of a connection between a central entity and the actual subscriber. The secure access may in particular be conducted via an electrical connection comprising two wires (also referred to as, e.g., a wire and b wire). In a particular example, the secure access may at least partially conducted via a subscriber line.

It is an option that the authentication is conducted via a first electrical connection and the access itself may be conducted via a second electrical connection. It is also an option that the authentication and the access utilize the same electrical connection.

Such access to the device may be required during production, repair and/or configuration. In any case, it is important to prevent the device from unauthorized access, especially after the device has been activated and is operative in the communication system.

Examples described herein allow access to a device in a running fixed line environment by utilizing various parameters as a signature for the authentication. This is beneficial in case, e.g., the device needs to be tested, debugged and/or configured. The communication with the device may be conducted via a dedicated port or interface (e.g., a debug port or a service port) and/or via a subscriber line.

By such authentication it is ensured that the running device cannot be freely accessed via a dedicated port by any unauthorized access system. Hence, the dedicated port can be used for access purposes after the authentication was successful; without proper authentication, access to the device is denied.

Many devices of a fixed line system, e.g., DSLAM, CPE or G.FAST DPU use line measurement functions like MELT or ILTF to check the quality of connected lines or to detect line errors. By utilizing parameters like resistance, capacitance, voltage, current, frequency, or the like, the measurement function may determine a signature to assess whether or not access to the device will be granted.

Examples presented herewith suggest utilizing the measurement function to determine a signature that is used for authentication purposes to the device. An access system requires access to the device and may provide a circuitry of various elements that contribute to measurement results that are determined by the measurement function of the device. In case the circuitry of the access system provides the correct signature for the measurement function to detect, access to the device is granted. This circuitry can also be perceived as a signature function (or part of the signature function) allowing the measurement function to detect a predefined signature.

Also, the physical connection between the access system and the device may have an impact on the measurement results. For example, a long physical connection may have a different capacity compared to a short physical connection. Hence, the physical connection may contribute to the signature to be detected by the measurement function.

FIG. 1 shows a device 101 of an active fixed line communication system. The device 101 may be a DSLAM, a DPU or a CPE. The device 101 comprises a measurement function 104 (e.g., MELT or ILTF). The device 101 is connected via a fixed line connection 102 to an access system 103. The access system 103 wants to access the device 101 (in this example via the connection 102).

The access system comprises a signature function 105, which exemplarily comprises a capacitor C1, a diode D1, a resistor R1 and an AC or DC source 106 (also referred to as power source). The connection 102 comprises two wires a and b, wherein at the access system 103, the a wire is connected via a series connection comprising the capacitor C1, the diode D1 and the resistor R1 to the b wire (wherein the cathode of the diode D1 points towards the b wire). Also, the b wire—at the access system 103—is connected via the AC or DC source 106 to ground. It is noted that the AC or DC source 106 may be any power supply providing AC or DC (optionally at a predetermined frequency and/or with a predetermined wave form).

The line measurement function 104 conducts measurements between the a wire and the b wire of the connection 102. The results of these measurements depend on the signature function 105 provided by the access system 103. In addition, the results of the measurements depend on the parameters of the connection 102 itself (e.g., the length of the connection 102). If the results of the measurements correspond to predefined values (or a range for each such value), the authentication succeeds, otherwise no authentication is achieved and access to the device 101 is denied.

In case of a successful authentication, access to the device 101 may be conducted via the connection 102 or via a separate connection (not shown) to the device 101.

For example, the following values can be set by the signature function 105 and by the connection 102 between the access system 103 and the device 101:
- capacitance between wire a and wire b: 50 nF
- resistance between wire a and wire b: 1.2 kOhm
- resistance between wire b and wire a: 10 MOhm (due to the diode D1)
- voltage between wire a and wire b: 0 V
- voltage between wire a and ground: 0 V
- voltage between wire b and ground: 63 V
- frequency on the connection between wire a and wire b: 0 Hz
- frequency between wire a and ground: 0 Hz
- frequency between wire b and ground: 112 Hz The line measurement function 104 conducts the measurements and compares the results with expected (predefined) values. If the results correspond (e.g., with some margin) to the predefined values, the authentication is successful and the access system 103 can be used to access the device 101. For this purpose, a shell of an operating system may be used at the device 101 to grant access to the operating system of the device 101. For example, a port may be enabled (activated) after successful authentication to grant access to the shell of the device 101.

It is noted that the number of parameters that are subject to the authentication may be defined by the line measurement function 104. It is noted that the number of parameters and/or the type of parameters may be defined after a number of k authentication(s), wherein k may be any number larger than zero.

It is further noted that more than one level of authentication may be implemented to obtain full access to the device 101. For example, in a second authentication, the user trying to access the device 101 via the shell may be prompted for a password. In another example, several measurements may be conducted by the measurement function 104 before granting access to the device 101.

The signature function 105 may be realized on a dongle or a programmable dongle which may provide a circuitry that supplies an electric response on signals supplied by the measurement function 104 of the device 101. The dongle may be a piece of hardware that interfaces with the access system 103. The dongle may in particular be removable from the access system 103. In an optional use case, the dongle may be used with different access systems.

In an exemplary use case, the access system 103 wants to access the device 101 (which may be active and running in a DSL environment). To achieve this, the access system 103 sets the signature function 105 and connects it to the wires a and b of the connection 102. By setting the signature function 105, the line parameters are influenced by the circuitry of the signature function 105, i.e. the capacitor C1, the diode D1, the resistor R1 and the AC or DC source 106. Hence, the circuitry of the signature function 105 that is connected to the wires a and b serves as a (hardware) signature for the line measurement function 104 of the device 101 to verify.

After it has been powered on, the device 101 may start its line measurement function 104. If the measurement results obtained by the line measurement function 104 are in the correct value ranges of the expected signature, the device 101 may grant access for the access system 103. Hence, only access systems with the correct signature obtain access to the device 101.

Figure 2:
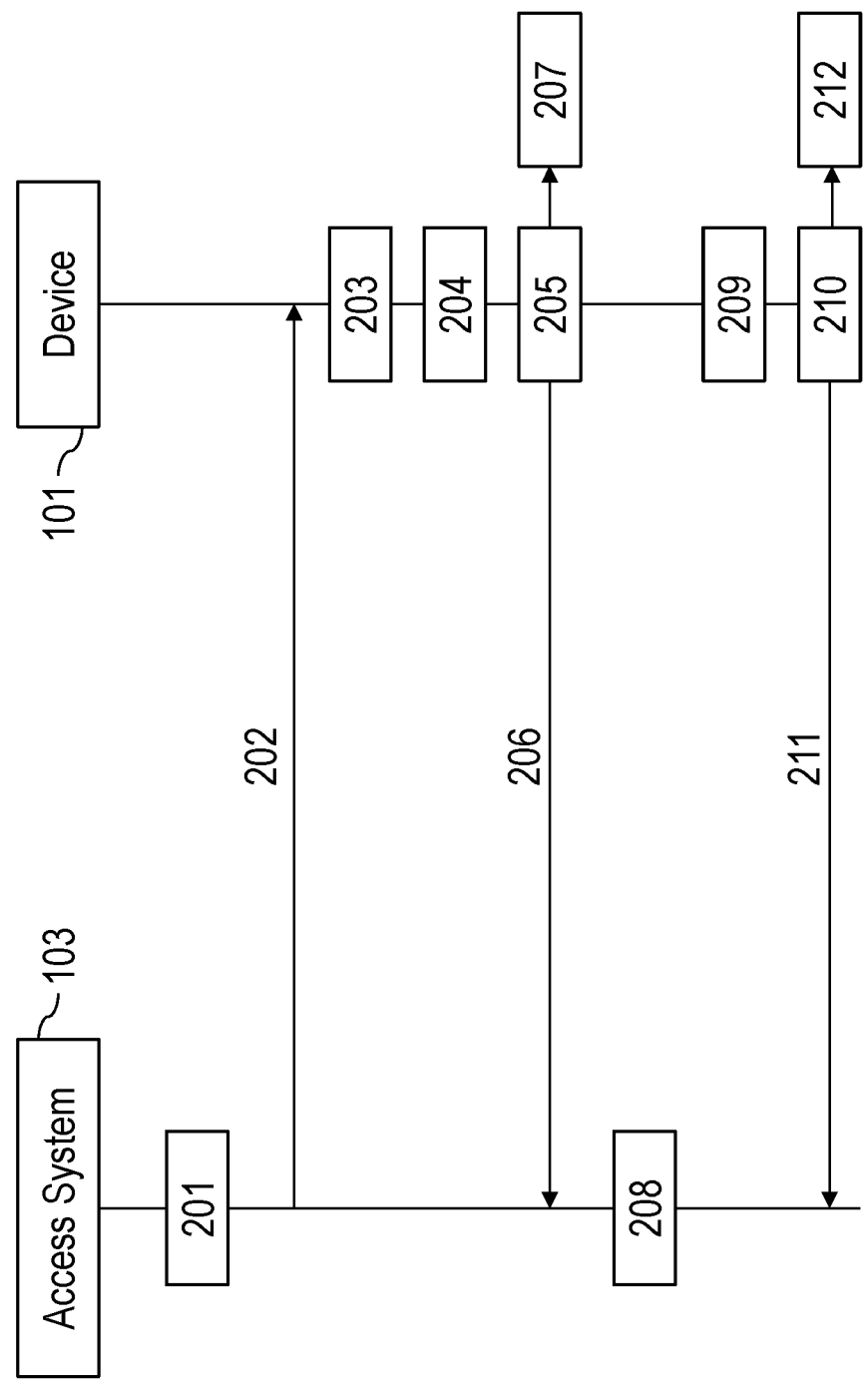
FIG. 2 shows a message sequence diagram illustrating a communication between the access system and the device.

FIG. 2 shows an implementation of providing an additional layer of security. The hardware components may be similar to those explained with regard to FIG. 1. FIG. 2 shows a message sequence diagram illustrating a communication between the access system 103 and the device 101.

In a step 201, the access system 103 sets values for the line parameters, i.e. it sets a first signature. This can be achieved via the signature function 105 shown in FIG. 1. It is noted that the signature function 105 may enable different circuitries thereby providing different signatures. Hence, the signature function 105 may be programmed to provide different circuitries. This applies to constant elements as well as to variable elements (e.g., a resistor may change its value according to a predefined pattern or a power source may adjust its voltage, current, waveform and/or frequency).

In a step 202, the access system 103 is connected to the device 101 via the connection 102. It is also an option that both devices are already connected. In such case, step 202 may be obsolete.

In a step 203, the device 101 is powered on.

In a step 204, the device 101 conducts a first measurement via its line measurement function 104; the first measurement produces first measurement results based on the first signature provided by the signature function 105 as well as based on the parameters of the connection 102 itself.

In a step 205, the device 101 determines whether the first measurement results correspond to first predefined values. If this is the case, a request for an additional signature is sent to the access system 103 in a step 206 (i.e. the first step of this multi-stage authentication is successful). If the first measurement results deviate from the first predefined values, an access to the device is denied in a step 207.

In a step 208, the access system 103 sets values for the line parameters, i.e. it sets a second signature in response to the request obtained in step 206. This can be achieved via the signature function 105 providing a different circuitry to be connected to the wires a and b of the connection 102. The request conveyed in step 206 may contain information that has an impact on setting the second signature.

In a step 209, the device 101 conducts a second measurement via its line measurement function 104; the second measurement produces second measurement results.

In a step 210, the device 101 determines whether the second measurement results correspond to second predefined values. If this is the case, access to the device 101 is granted in a step 211. If the second measurement results deviate from the second predefined values, an access to the device is denied in a step 212.

It is an option that the second signature may depend on information provided by the device 101 in the request sent in step 206: For example, the device 101 may send a sequence comprising a serial number, a MAC address, a production date, a software version or a combination thereof to the access system 103. This information may be used by the access system 103 to set up the second signature. It is also an option to toggle at least one of the parameters, e.g., switch between a set of predefined parameters.

For example, the information of the device can be sent to the access system 103 and the access system 103 uses this information to adjust the signature function 105. Adjusting the signature function 105 may comprise setting or adjusting values of the capacitor C1, the diode D1, the resistor R1 and/or the AC or DC source 106 according to a rule which has to be known by the access system 103 and the device 101. For example the first three digits of the MAC address may be used to set the capacity of the capacitor C1, the next digit may be used to set the diode D1 (switch its orientation, i.e. change the position of the anode and the cathode), etc. The access system 103 and the device 101 share the knowledge of the rule; hence, the device 101 and the measurement function 104 know what to measurement values to expect according to the rule and the information sent to the access system 103.

It is also an option that the rule itself can be updated at the access system 103 and the device 101. Hence, the information sent from the device 101 to the access system 103 may be unique to the device 101 (e.g., using the MAC address of the device 101), but due to the rule it may have a different impact on setting the parameters of the signature function 105 at the device 103 (due to the rule).

For example, the following values can be set by the signature function 105 and by the connection 102 between the access system 103 and the device 101:

capacitance between wire a and wire b: 1 µF
resistance between wire a and wire b: 20 Ohm
resistance between wire b and wire a: 1 kOhm (this can be achieved by replacing the diode D1 by a resistor)
voltage between wire a and wire b: 0 V
voltage between wire a and ground: 10 V
voltage between wire b and ground: 83 V
frequency on connection between wire a and wire b: 0 Hz
frequency between wire a and ground: 0 Hz
frequency between wire b and ground: toggle between 112 Hz and 60 Hz.

These parameters are then measured by the line measurement function 104. After successful verification of these parameters by the device 101, the device 101 may allow access via the connection 102 for security sensitive purposes, e.g., access to its internal resources, configuration parameters, etc.

This second signature may be unique for each device 101.
Further Advantages:

The solution described herein does not require that the device to be accessed has a dedicated protected debug or service port. Instead, an existing connection that may otherwise serve as a connection to a subscriber line, can be used for configuration and/or debugging purposes.

The authentication proposed herein allows for a secure access to internal resources of the device. Due to the large number of parameters that can be used and/or combined, the level of security can be flexibly adjusted and it may suffice to meet high security requirements. Also, due to the level of security required, a large number of (even varying) parameters can be used to determine whether access is to be granted. In addition, another level of security can be added by multiple sets of parameters (signatures) to be checked. Furthermore, this approach can be combined with other means of authentication, e.g., entering a password, before getting actual access to the internal resources of the device. In addition, the signature that enables access may change over time, in particular with every new software version updated to the device.

It is also an advantage that the electrical parameters of the connection 102 itself contribute to the signature. Hence, an access attempt via a connection that is substantially longer than the connection expected (due to the comparison of the parameters) does not lead to a successful authentication, because the capacity of the longer connection may be substantially different from the expected length of the connection.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for accessing a device of a fixed line system, the method comprising:
  determining at least one measurement result by a measurement function of the device;
  comparing the at least one measurement result with at least one predefined value;
  conducting a predefined operation if the comparison indicates that the at least one measurement result corresponds to the at least one predefined value.

By comparing the at least one measurement result with the at least one predefined value, for each measurement results it is determined whether a condition "the respective measurement result corresponds to its associated predefined value" is met or not. For example, the measurement result may be compared with a range of values and this condition is met only if the measurement result lies within this range. As another example, the measurement result may be compared with a predefined value including a plus-minus margin to also accept the measurement result to fulfill the condition if it slightly deviates from the predefined value. It is also an option that the measurement result is compared with a single value without any margin. In summary, the measurement result does not have to be (but it may be) the same as the predefined value to meet the condition cited above.

In some implementations,
  at least two measurement results are determined by the measurement function of the device;
  the at least two measurement results are compared with at least two predefined values; and
  a predefined operation is conducted if the comparison indicates that the at least two measurement results correspond to the at least two predefined values.

Hence, it is an option to use more than one measurement value. This increases the level of security.

It is noted that the measurement function may determine at least two measurement results that each meets the condition "correspond to its associated predefined value". If this is the case, the predefined operation is conducted. Otherwise, the predefined operation is not conducted.

In some implementations, the device is at least one of the following:
  a DSLAM;
  a CPE;
  a DPU.

In some implementations, the measurement function comprises a Metallic Ended Line Test or an Integrated Line Test Function.

In some implementations, the predefined operation comprises granting access to the device.

In some implementations, the method further comprises:
  denying access to the device if the comparison indicates that the at least one measurement result does not correspond to the at least one predefined value.

In some implementations, the method further comprises:
  determining the at least one measurement result by the measurement function, wherein the measurement function is connected or connectable via a connection to a signature function of an access system.

In some implementations, the connection is a fixed line connection comprising two wires.

The connection may in particular be a subscriber line of a fixed line telecommunication system.

In some implementations, the signature function comprises a circuitry that affect parameters measured by the measurement function of the device.

In some implementations, the signature function is arranged to provide at least one set of parameters.

The parameters may be an electrical parameter (capacity, voltage, current, etc.), which may be static, quasi-static or dynamic. Hence, the parameter may change over time and such changes may (at least partially) be generated by the signature function. For example, a supply signal may have a certain waveform, frequency or pattern for the device to verify (or not).

In some implementations, the signature function is implemented on a dongle that is connectable to the access system.

The dongle may be removable from the access system.

In some implementations, the predefined operation comprises:
  providing a message to the access system;
  determining at least one additional measurement result by the measurement function of the device;
  comparing the at least one additional measurement result with at least one additional predefined value;
  conducting a further predefined operation if the comparison indicates that the at least one additional measurement result corresponds to the at least one additional predefined value.

In some implementations, the further predefined operation comprises granting access to the device.

In some implementations, the method further comprises:
  denying access to the device if the comparison indicates that the at least one additional measurement result does not correspond to the at least one additional predefined value.

Also a for accessing a device via an access system is provided,
  wherein the access system comprises a signature function for setting a signature,
  wherein the device comprises a measurement function for measuring at least one electrical parameter,
  wherein the measurement function and the signature function are connected via a connection of a fixed line telephone system,
  the method comprising:
    setting by the signature function a first signature;
    determining a first at least one measurement result by the measurement function;
    comparing by the device the first at least one measurement result with a first at least one predefined value;
    conducting a first predefined operation if the comparison indicates that the first at least one measurement result corresponds to the first at least one predefined value.

In some implementations, the first predefined operation comprises granting access to the device.

In some implementations, the method further comprises:
  as the first predefined operation: conveying a message from the device to the access system,
  setting by the signature function a second signature based on the message,
  determining a second at least one measurement result by the measurement function;
  comparing by the device the second at least one measurement result with a second at least one predefined value;

conducting a second predefined operation if the comparison indicates that the second at least one measurement result corresponds to the second at least one predefined value.

In some implementations, the second predefined operation comprises granting access to the device.

In some implementations, the second predefined operation comprises another level of authentication.

This additional level of authentication may be entering a password or the like.

A device of a fixed line system is provided, which comprises a processing unit that is arranged for
  determining at least one measurement result;
  comparing the at least one measurement result with at least one predefined value;
  conducting a predefined operation if the comparison indicates that the at least one measurement result corresponds to the at least one predefined value.

An access system is suggested for accessing the device as described herein, wherein the access system comprises a signature function that is connected or connectable via a connection, in particular a fixed line of the telephone system, to the device.

In some implementations, the signature function is arranged to adjust a signature based on a message received by the device.

A computer program product is suggested, which is directly loadable into a memory of a digital processing device, comprising software code portions for performing the steps of the method as described herein.

A computer-readable medium is provided, which has computer-executable instructions adapted to cause a computer system to perform the steps of the method according to the method as described herein.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

List of Abbreviations

CO Central Office
CPE Customer Premises Equipment
DPU Distribution Point Unit
DSL Digital Subscriber Line
DSLAM DSL Access Multiplexer
FTU Fast Transceiver Unit
FTU-O FTU at the Optical Network Unit (or central office, exchange, cabinet, distribution point, etc., i.e., operator end of the loop)
FTU-R FTU at the Remote site (i.e., subscriber end of the loop)
GPON Gigabit PON
ILTF Integrated Line Test Function
MAC Media Access Control
MDU Multi-Dwelling Unit
MELT Metallic Ended Line Test
PON Passive Optical Network
VDSL Very High Speed Digital Subscriber Line

The invention claimed is:

1. A method for accessing a device of a fixed line system comprising:
  determining, by the device, at least one measurement result of a signature function circuit of an access system that is connected to the device by a measurement function of the device, the at least one measurement result including an electric response of the signature function circuit to signals supplied by the measurement function;
  comparing the at least one measurement result with at least one predefined value;
  conducting a predefined operation from among two or more predefined operations based on the comparison of the at least one measurement result with the at least one predefined value, including:
  granting, to the access system, access to the device through a connection between the device and the signature function circuit in response to the comparison indicating that the at least one measurement result meets the at least one predefined value; and
  denying the access system from accessing the device through the connection between the device and the signature function circuit in response to the comparison indicating that the at least one measurement result does not meet the at least one predefined values;
  sending, by the device and in response to determining that the at least one measurement result meets the at least one predefined value, a sequence of data to the access device;
  obtaining, by the device, an adjusted measurement result of the signature function circuit; and
  comparing, by the device, the adjusted measurement result to a set of adjusted predefined values expected to be received from the access device responsive to the sequence of data, wherein:
  granting access to the device is only performed when (i) the comparison of the at least one measurement result with the at least one predefined value indicates that the at least one measurement result meets the at least one predefined value and (ii) the comparison of the adjusted measurement result meets the set of adjusted predefined values expected to be received from the access device responsive to the sequence of data.

2. The method according to claim 1, wherein the device is at least one of a Digital Subscriber Line Access Multiplexer (DSLAM); a Customer Premises Equipment (CPE); or a Distribution Point Unit (DPU).

3. The method according to claim 1, wherein the measurement function comprises a Metallic Ended Line Test or an Integrated Line Test Function.

4. The method according to claim 1, wherein the connection is a fixed line connection comprising two wires.

5. The method according to claim 1, wherein the signature function circuit is implemented in a dongle that is connectable to the access system.

6. The method according to claim 1, further comprising:
  providing a message to the access system;
  determining at least one additional measurement result by the measurement function of the device;

comparing the at least one additional measurement result with at least one additional predefined value; and a further predefined operation if the comparison indicates that the at least one additional measurement result corresponds to the at least one additional predefined value.

7. The method according to claim 6, further comprising:
denying access to the device if the comparison indicates that the at least one additional measurement result does not correspond to the at least one additional predefined value.

8. A method for accessing a device via an access system,
wherein the access system comprises a signature function circuit that is configured to output an electronic response to signals supplied by a measurement function of the device;

wherein the device and the signature function circuit are connected via a connection of a fixed line telephone system, the method comprising:
  outputting by the signature function circuit an electronic response defining a first signature of the access system;
  determining a first at least one measurement result by the measurement function of the device;
  comparing by the device the first at least one measurement result with a first at least one predefined value; and
  conducting a first predefined operation from among two or more predefined operations based on the comparison of the first at least one measurement result with the at least one predefined value, including:
    granting, to the access system, access to the device through a connection between the device and the signature function circuit in response to the comparison indicating that the first at least one measurement result meets the first at least one predefined value; and
    denying the access system from accessing the device through the connection between the device and the signature function circuit in response to the comparison indicating that the first at least one measurement result does not meet the first at least one predefined value;
  in response to determining that the at least one measurement result meets the at least one predefined value;
    determining an adjusted measurement result of the signature function circuit based on a sequence of data; and
    comparing the adjusted measurement result to a set of adjusted predefined values expected to be generated responsive to the sequence of data, wherein:
      granting access to the device is only performed when (i) the comparison of the at least one measurement result with the at least one predefined value indicates that the at least one measurement result meets the at least one predefined value and (ii) the comparison of the adjusted measurement result meets the set of adjusted predefined values expected to be received from the access device responsive to the sequence of data.

9. A non-transitory computer-readable medium storing computer-executable instructions that cause a computer system to perform operations comprising:
  determining, by the device, at least one measurement result of a signature function circuit of an access system that is connected to the device by a measurement function of the device, the at least one measurement result including an electric response of the signature function circuit to signals supplied by the measurement function;
  comparing the at least one measurement result with at least one predefined value;
  conducting a predefined operation from among two or more predefined operations based on the comparison of the at least one measurement result with the at least one predefined value, including:
    granting, to the access system, access to the device through a connection between the device and the signature function circuit in response to the comparison indicating that the at least one measurement result meets the at least one predefined value; and
    denying the access system from accessing the device through the connection between the device and the signature function circuit in response to the comparison indicating that the at least one measurement result does not meet the at least one predefined value;
  sending, by the device and in response to determining that the at least one measurement result meets the at least one predefined value, a sequence of data to the access device;
  obtaining, by the device, an adjusted measurement result of the signature function circuit; and
  comparing, by the device, the adjusted measurement result to a set of adjusted predefined values expected to be received from the access device responsive to the sequence of data, wherein:
    granting access to the device is only performed when (i) the comparison of the at least one measurement result with the at least one predefined value indicates that the at least one measurement result meets the at least one predefined value and (ii) the comparison of the adjusted measurement result meets the set of adjusted predefined values expected to be received from the access device responsive to the sequence of data.

* * * * *